March 5, 1935. G. M. FERGUSSON 1,993,321
PLUG AND SOCKET CLOSURE FOR WASH BASINS,
BATHS, SINKS, AND OTHER RECEPTACLES
Filed May 28, 1934
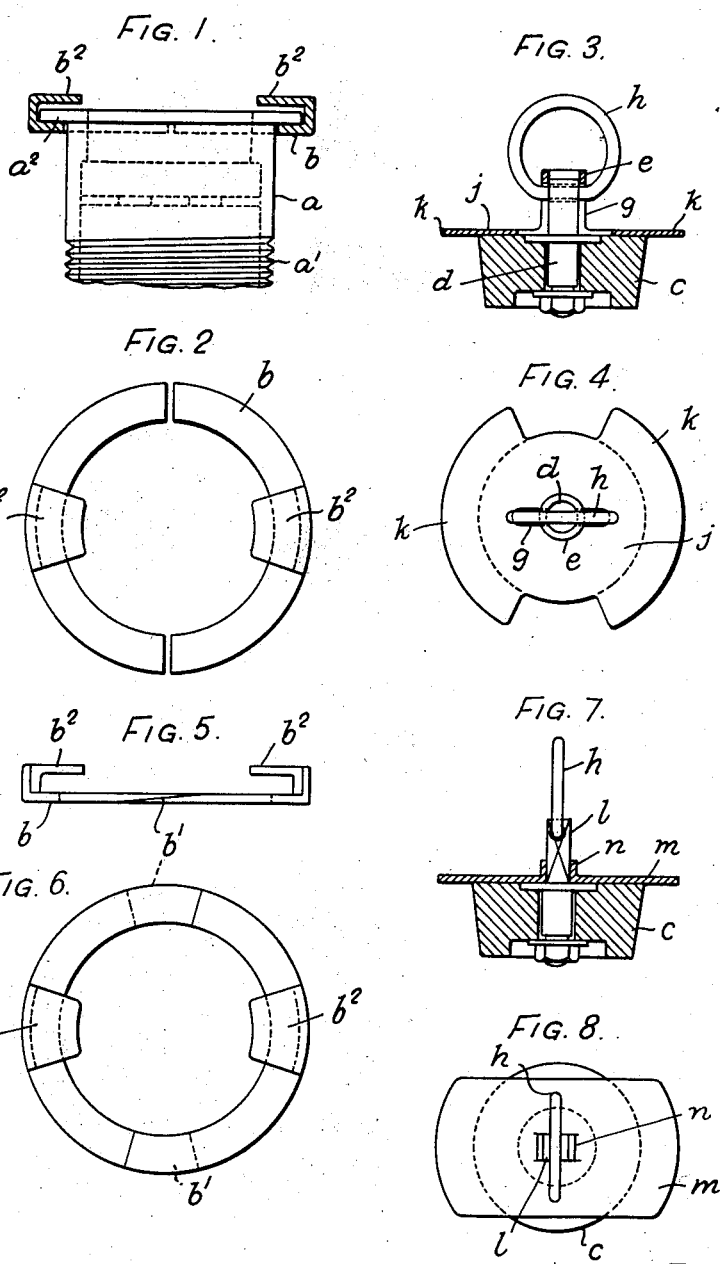
Inventor
Gwynneth M. Fergusson
by Wilkinson & Mawhinney
Attorneys.

Patented Mar. 5, 1935

1,993,321

UNITED STATES PATENT OFFICE 1,993,321

PLUG AND SOCKET CLOSURE FOR WASH BASINS, BATHS, SINKS, AND OTHER RECEPTACLES

Gwynneth Maud Fergusson, London, England

Application May 28, 1934, Serial No. 728,028
In Great Britain July 18, 1933

4 Claims. (Cl. 4—295)

This invention relates to plugs adapted to fit into correspondingly shaped sockets secured to the outlets of wash basins, baths, sinks and other receptacles for liquids.

In my prior British specification No. 344,257 I have described and claimed means for preventing accidental removal of the plug from its socket, such means comprising a stem passing through the body of the plug, and one or more lugs attached to the stem and engaging in a groove or grooves provided in the socket. The present invention relates to improvements in or modifications of such a closure.

According to this invention the groove in the socket is eliminated and replaced by a washer passed over the stem of the socket and caused to bear against the under surface of the upper part of the socket. This washer carries locking means in the form of one or more lugs adapted to be bent over the upper surface of the upper part of the socket. If the lugs on the plug member are caused to co-operate with, e. g. by engaging beneath, the lugs on the washer it is impossible for the plug to be lifted out of engagement with the socket.

In one form of construction the upper part of the stem of the plug, which is preferably of conical formation, is surrounded by a sleeve, and the lugs are integral with or secured to this sleeve. A ring is provided for the removal of the plug from the socket.

The lugs on the washer may be formed integrally with the washer, or may be made as separate units adapted to be placed around the periphery of the washer and bent into the required position.

Two forms of construction of the invention are illustrated in the annexed drawing, in which:—

Fig. 1 is a vertical section of a socket and its associated washer.

Fig. 2 is a plan view of the washer shown in Fig. 1.

Fig. 3 is a vertical section of a plug member, and

Fig. 4 is a plan of the plug member.

Fig. 5 is a detail view of a modified form of washer, and

Fig. 6 is a plan view of this modified form of washer.

Figs. 7 and 8 illustrate a further modification.

Referring first to Figs. 1 and 2, $a$ is the socket, screw-threaded at its lower part $a'$ to facilitate attachment to a bath or the like, and provided at its upper part with a flange $a^2$. Surrounding the socket $a$ is a metal washer $b$, formed in two parts as shown in Fig. 2 and adapted to be placed around the socket $a$. This washer is provided with two or more lugs $b^2$, which may be integral with the washer, as shown in Fig. 1, and which are adapted to be bent over the upper surface of the flange $a^2$. The washer, through which the stem of the socket passes, may be either in the form of a solid ring or may be divided into semicircular or other segments, and the lugs need not necessarily be integral with the washer, and may be located in any position around the washer.

The plug member shown in Figs. 3 and 4 comprises a conical member $c$ through which passes a stem $d$. Surrounding the upper part of the stem $d$ is an open-ended sleeve $e$, formed with an elongated slot $g$ through which passes a ring $h$ which also passes through an opening in the stem $d$. The sleeve $e$ is integral with a plate $j$, which normally rests on the upper surface of the member $c$ and is formed with two lugs $k$. When it is desired to retain the plug in a locked position in the socket, the plug is inserted in the opening in the socket and rotated until the lugs $k$ engage beneath the lugs $b^2$ of the washer $b$ which serves as a locking member. It will be noted that the area of the lugs $k$ is large relatively to that of the lugs $b^2$. The converse arrangement might be employed. The open-ended sleeve $e$ facilitates the removal of sediment.

The washer shown in Figs. 5 and 6 is similar to that shown in Figs. 1 and 2, except that in the case of Figs. 5 and 6 the washer is formed of two overlapping segments cut on the bias to form an overlapping joint as shown at $b'$.

The plug member shown in Figs. 7 and 8 comprises a conical member $c$ through which passes a square section stem $l$. A ring $h$ passes through the upper part of the stem $l$. The plate $m$ which normally rests on the surface of member $c$ is formed with two small flanges $n$. The flanges $n$ bear against two sides of the square section stem $l$ so that although the plate $m$ is free to move between the conical member $c$ and the ring $h$ it is prevented from revolving on the stem $l$. Thus when this plug member is inserted in the socket and the ring $h$ is turned the plate engages under the lugs $b^2$ causing the plug member to become locked.

Having thus described the nature of the said invention and the best means I know of carrying the same into practical effect, I claim:—

1. A plug and socket closure for use in wash basins, baths, sinks and other liquid-containing receptacles, such closure comprising a flanged socket around which is passed a washer provided with one or more lugs, which washer is adapted to be caused to bear against the under surface of the upper part of the socket and a plug member also provided with one or more lugs adapted to co-operate with the lug or lugs on the washer to prevent accidental removal of the plug from the socket.

2. A plug and socket closure according to claim 1, in which the lug or lugs of the plug member is or are integral with a plate and an open-ended sleeve surrounding a stem that passes through the plug.

3. A closure according to claim 1, in which a plate with which the lug or lugs of the plug member is or are integral is provided with upstanding flanges, bearing against the stem of the plug member.

4. A plug and socket closure according to claim 1, in which the lug or lugs of the plug member is or are adapted to engage beneath the lug or lugs of the socket member.

GWYNNETH MAUD FERGUSSON.